(12) United States Patent
Destories et al.

(10) Patent No.: US 10,889,073 B2
(45) Date of Patent: Jan. 12, 2021

(54) CONTROLLABLE MULTI-CELLED BLADDERS FOR COMPOSITES

(71) Applicant: The Boeing Company, Chicago, IL (US)

(72) Inventors: Jason G. Destories, Mesa, AZ (US); Curtis R. Estevo, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 341 days.

(21) Appl. No.: 15/456,881

(22) Filed: Mar. 13, 2017

(65) Prior Publication Data

US 2018/0257314 A1    Sep. 13, 2018

(51) Int. Cl.
| | | |
|---|---|---|
| B29C 70/34 | (2006.01) | |
| B29C 70/46 | (2006.01) | |
| B29C 33/50 | (2006.01) | |
| B29K 105/08 | (2006.01) | |
| B29K 307/04 | (2006.01) | |

(52) U.S. Cl.
CPC .......... B29C 70/342 (2013.01); B29C 33/505 (2013.01); B29C 70/46 (2013.01); *B29K 2105/0872* (2013.01); *B29K 2307/04* (2013.01)

(58) Field of Classification Search
CPC .............. B29C 70/342; B29C 43/3642; B29C 2043/3647; B29C 2043/3655
See application file for complete search history.

(56) References Cited

U.S. PATENT DOCUMENTS

| | | | | |
|---|---|---|---|---|
| 4,357,193 A | * | 11/1982 | McGann | ............. B29C 35/0227 156/286 |
| 4,704,028 A | * | 11/1987 | Richards, Sr. | ......... G03B 27/20 355/92 |
| 5,394,220 A | | 2/1995 | Leonhart et al. | |
| 5,441,692 A | * | 8/1995 | Taricco | ................... B29C 70/48 264/257 |

(Continued)

FOREIGN PATENT DOCUMENTS

| | | |
|---|---|---|
| EP | 2623302 A1 | 8/2013 |
| EP | 3103626 A1 | 12/2016 |

(Continued)

OTHER PUBLICATIONS

European Search Report; Application 18161241.7-1019; Aug. 27, 2018.

(Continued)

*Primary Examiner* — Matthew J Daniels
(74) *Attorney, Agent, or Firm* — Duft & Bornsen, PC

(57) ABSTRACT

Systems and methods are provided for multi-celled pressurizable air bladders. One embodiment is an apparatus that includes a bladder. The bladder includes a casing that encloses an internal volume of the bladder, walls within the bladder that subdivide the internal volume into cells that are airtight with respect to each other, and ducting that couples each of the cells with a source of pressurized gas via a distinct pathway. The apparatus also includes a controller that progressively pressurizes individual cells within the bladder from a first portion of a laminate to a second portion of the laminate by controlling application of gas from the source via the ducting.

20 Claims, 12 Drawing Sheets

(56) References Cited

U.S. PATENT DOCUMENTS

| | | | |
|---|---|---|---|
| 5,665,301 A * | 9/1997 | Alanko | B29C 70/443 |
| | | | 264/257 |
| 7,413,694 B2 | 8/2008 | Waldrop et al. | |
| 2004/0226996 A1 | 11/2004 | Stefani | |
| 2006/0038077 A1 | 2/2006 | Olin et al. | |
| 2008/0210372 A1* | 9/2008 | Cumings | B29C 70/44 |
| | | | 156/286 |
| 2011/0313563 A1 | 12/2011 | Huber | |

FOREIGN PATENT DOCUMENTS

| | | | |
|---|---|---|---|
| WO | 0054951 A1 | 9/2000 | |
| WO | WO-2013113749 A1 * | 8/2013 | ......... B32B 37/1009 |
| WO | 2014032443 A1 | 3/2014 | |

OTHER PUBLICATIONS

Patent Application 14936870.
Researchgate.net; 2008-2017; Search for publications, reseachers, or questions.
European examination report; Application 171978323-1222; dated Jan. 25, 2019.
Kelly Fok et al; "Optimizing Air Cargo Load Planning and Analysis"; Aug. 17, 2004.
Mongeau M et all; "Optimization of Aircraft container Loading"; Jan. 1, 2003.

* cited by examiner

FIG. 8

PERISTALTIC FLOW — 800

TIME ↓

| | A | B | C | D | E | F | G |
|---|---|---|---|---|---|---|---|
| INITIALIZATION | ON | OFF | OFF | OFF | OFF | OFF | OFF |
| | ON | ON | OFF | OFF | OFF | OFF | OFF |
| | ON | ON | ON | OFF | OFF | OFF | OFF |
| PULSE | OFF | ON | ON | ON | OFF | OFF | OFF |
| | OFF | OFF | ON | ON | ON | OFF | OFF |
| | ON | OFF | OFF | ON | ON | ON | OFF |
| | ON | ON | OFF | OFF | ON | ON | ON |
| | ON | ON | ON | OFF | OFF | ON | ON |
| PULSE | OFF | ON | ON | ON | OFF | OFF | ON |
| | OFF | OFF | ON | ON | ON | OFF | OFF |
| | ON | OFF | OFF | ON | ON | ON | OFF |
| | ON | ON | OFF | OFF | ON | ON | ON |
| | ON | ON | ON | OFF | OFF | ON | ON |
| PULSE | OFF | ON | ON | ON | OFF | OFF | ON |
| | OFF | OFF | ON | ON | ON | OFF | OFF |

FIG. 9

RESIN PENETRATION MASSAGE — 900

TIME ↓

| A | B | C | D | E | F | G |
|---|---|---|---|---|---|---|
| ON | OFF | ON | OFF | ON | OFF | ON |
| OFF | ON | OFF | ON | OFF | ON | OFF |
| ON | OFF | ON | OFF | ON | OFF | ON |
| OFF | ON | OFF | ON | OFF | ON | OFF |
| ON | OFF | ON | OFF | ON | OFF | ON |
| OFF | ON | OFF | ON | OFF | ON | OFF |

CONTROLLABLE MULTI-CELLED BLADDERS FOR COMPOSITES

FIELD

The disclosure relates to the field of composites, and in particular, to the formation of composite parts.

BACKGROUND

Composite parts, such as those made from Carbon Fiber Reinforced Polymer (CFRP), are formed into a variety of complex shapes. In order to fabricate a composite part, multiple layers of a constituent material (e.g., carbon fiber) are laid-up to form a laminate. The layers of the laminate may be pre-impregnated with a curable resin (e.g., a thermoset resin or thermoplastic resin), or may comprise dry carbon fibers awaiting resin impregnation. After impregnation with resin, the laminate may be cured into a solid composite part, for example via the application of heat in an autoclave.

When forming a laminate into a desired shape during or prior to curing, a pressurized air bladder may hold the laminate against a forming tool. However, air pockets within the laminate may remain trapped between the air bladder and the forming tool during consolidation, which is undesirable.

SUMMARY

Embodiments described herein provide for enhanced air bladders that include multiple cells which are capable of being independently pressurized. This enables cells of the air bladder to be progressively inflated in a desired order, thereby pushing air pockets within the laminate in a desired direction (e.g., out of the laminate). In further embodiments, the cells may be pressurized in an order that facilitates resin impregnation for a laminate prior to curing.

One embodiment is an apparatus that includes a bladder. The bladder includes a casing that encloses an internal volume of the bladder, walls within the bladder that subdivide the internal volume into cells that are airtight with respect to each other, and ducting that couples each of the cells with a source of pressurized gas via a distinct pathway. The apparatus also includes a controller that progressively pressurizes individual cells within the bladder from a first portion of a laminate to a second portion of the laminate by controlling application of gas from the source via the ducting.

A further embodiment is a system that includes a first forming tool, and a bladder that includes a casing that encloses an internal volume. Walls within the bladder that subdivide the internal volume into cells that are airtight with respect to each other. The system also includes a laminate of Carbon Fiber Reinforced Polymer (CFRP) placed between the bladder and the first forming tool, a source of pressurized gas, ducting that independently couples the source with each of the cells, and a controller that controls inflation of the bladder by selectively inflating individual cells of the bladder.

A further embodiment is a method. The method includes laying up a laminate of Carbon Fiber Reinforced Polymer (CFRP) onto a forming tool, placing a bladder atop the laminate, identifying cells within the bladder that are located at a first portion of the laminate, and identifying cells within the bladder that are located at a second portion of the laminate. The method also includes forcing air pockets of the laminate from the first portion to the second portion by progressively inflating cells from the first portion to the second portion.

A further embodiment is an apparatus that includes a bladder. The bladder includes a casing that encloses an internal volume of the bladder, walls within the bladder that subdivide the internal volume into cells that are airtight with respect to each other, and ducting that couples each cell in a central portion of the bladder with a source of pressurized gas via a distinct pathway. The apparatus also includes valves that couple cells in a periphery of the bladder with cells in the central portion of the bladder.

A further embodiment is a method. The method includes controlling resin movement within a composite pre-form during consolidation. This includes placing the preform on a mandrel, laying a vacuum bag having an array of individually controlled pressure cells over the preform, placing resin under the vacuum bag, and individually controlling pressure in at least one cell of the vacuum bag to manipulate resin flow.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 8 is a table illustrating pressurization sequences for cells that simulate peristaltic flow in an exemplary embodiment.

FIG. 9 is a table illustrating pressurization sequences for cells that massage resin into dry fibers of a laminate in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
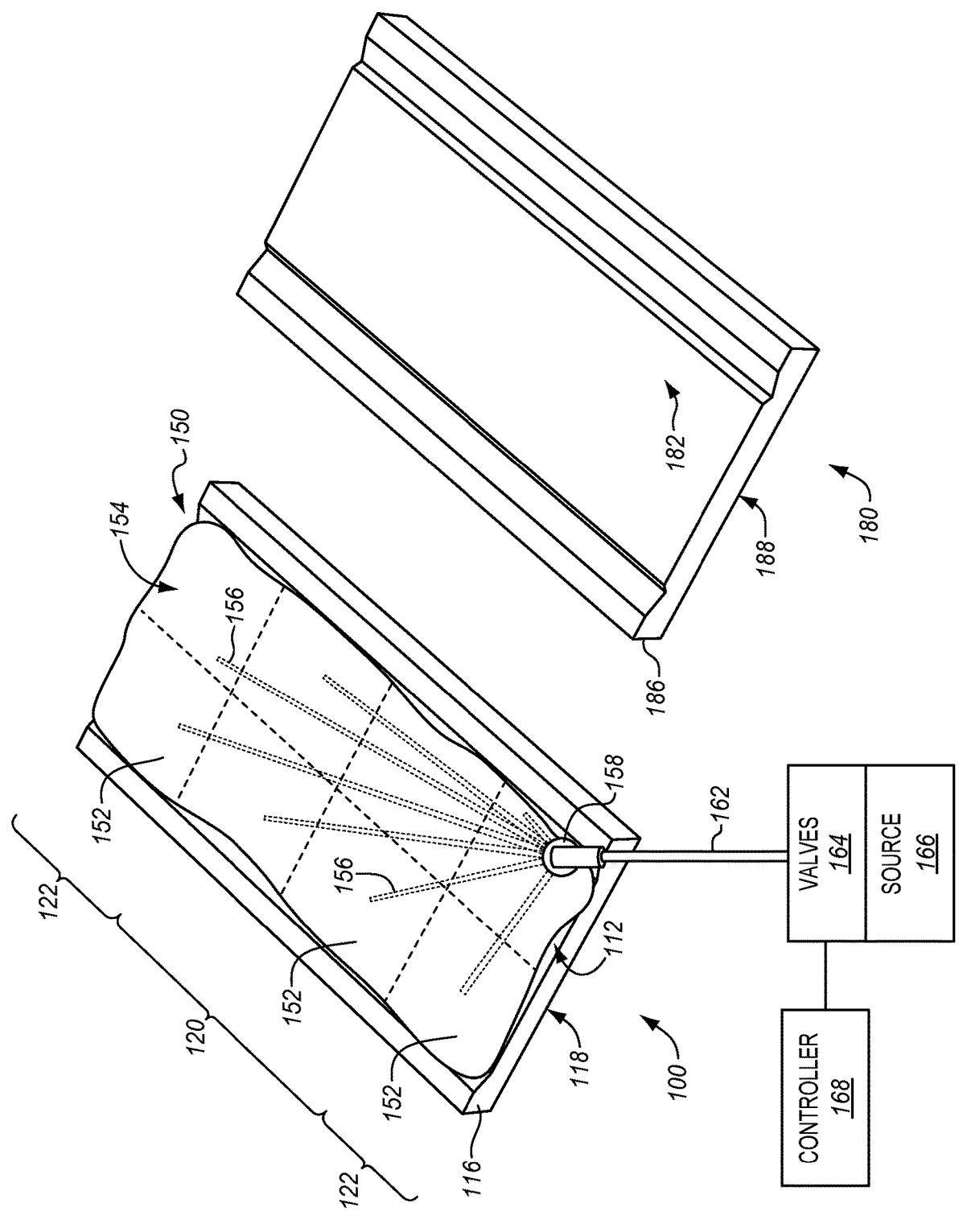
FIG. 1 is a perspective view of a bladder and complementary forming tools in an exemplary embodiment.

FIG. 1 is a perspective view of bladder 150 and complementary forming tools in an exemplary embodiment. Bladder 150, in combination with forming tool 100 and forming tool 180, consolidates a laminate of constituent material into a desired shape for curing into an integral composite part (i.e., a CFRP part). Forming tool is bounded by lower surface 118 and upper surface 112. Forming tool 100 further includes side 116. Upper surface 112 of forming tool 100 defines the shape of one side of a laminate.

Bladder 150 is positioned over upper surface 112. Bladder 150 is pressurized during shaping to force a laminate to conform with upper surface 112. Bladder 150 includes an airtight casing 154, which encloses an internal volume of bladder 150. Casing 154 is flexible, and may comprise one eighth inch thick silicone or rubber capable of withstanding substantial heat and temperature (e.g., 65-90 pounds per square inch (PSI) at 190° Fahrenheit (F)-290° F.). As discussed in the paragraphs above, all examples including the one above are non-limiting. Hence, other materials and thicknesses are possible.

Bladder 150 further includes multiple cells 152, which are each separately pressurizable via ducting 156 (e.g., tubing). Ducting 156 couples each cell 152 with pressure source 166 via a unique/distinct pathway, enabling each cell 152 to be independently pressurized. That is, each segment of ducting 156 that provides a pathway from a valve 164 to a cell 152 is not shared with any other cell 152. Ducting 156 penetrates casing 154 via main port 158, and is internally routed to corresponding cells 152. Sheath 162 surrounds ducting 156 as ducting 156 proceeds to valves 164. Valves 164 are controlled by controller 168 to supply pressurized gas from source 166 and inflate individual cells 152. That is, each valve 164 may control a different piece of ducting 156 to apply gas to a different cell 152. Thus, controller 168 selectively pressurizes bladder 150 on a cell-by-cell basis. In this manner, cells in bladder 150 at a first portion (e.g., a central portion such as region 120) of the laminate may be inflated prior to inflating cells of bladder 150 at a second portion (e.g., a periphery such as regions 122) of the laminate. Inflating cells 152 in this order pushes air pockets out of the laminate. Furthermore, bladder 150 may push resin through a laminate, thus reducing resin rich areas and resin starved areas to ensure even resin impregnation. Controller 168 may be implemented, for example, as custom circuitry, as a hardware processor executing programmed instructions, or some combination thereof. In a further embodiment, controller 168 may direct the operations of valves 164 via air logic/circuitry in order to selectively inflate or pressurize individual cells 152 of bladder 150.

Bladder 150 may be subdivided into any suitable number of cells 152. Furthermore, a central region of bladder 150 may include any suitable combination of cells 152 proximate to a center of bladder 150, and a periphery of bladder 150 may include any suitable combination of cells 152 proximate to distal portions of bladder 150.

Forming tool 180 is designed for placement over bladder 150, such that a laminate is sandwiched between surface 182 of forming tool 180 (e.g., a mandrel) and casing 154 of bladder 150 during resin infusion of a dry preform and then consolidation of the resin infused preform. Bladder 150 may further be used during consolidation of a prepreg preform. Forming tool 180 further includes side 186 and surface 188.

Figure 2:
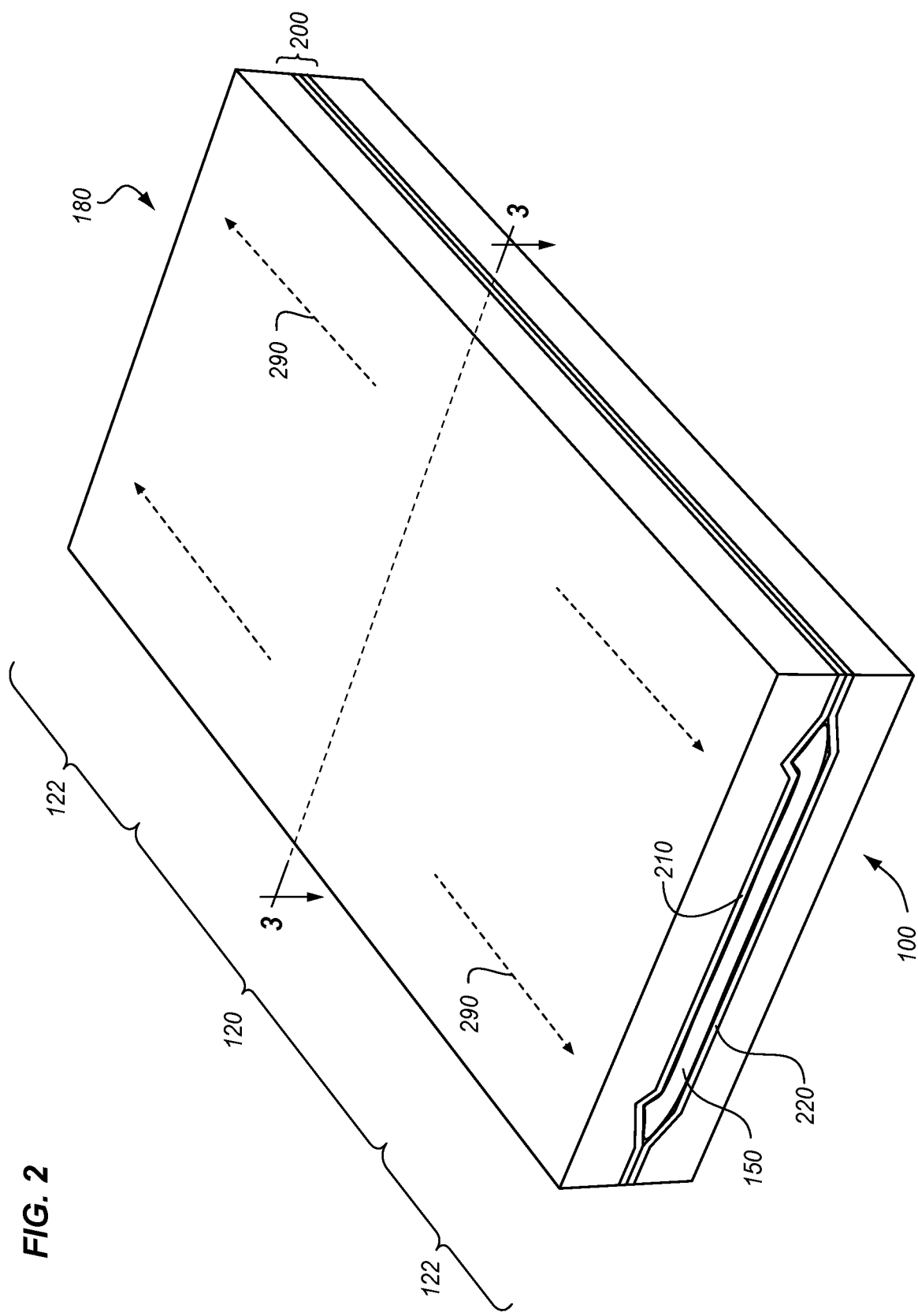
FIG. 2 is a perspective view of removal of air pockets from a laminate by pressurizing cells of a bladder in an ordered sequence in an exemplary embodiment.

FIG. 2 illustrates an environment wherein a laminate 200, comprising layer 210 laid up onto forming tool 180, and layer 220 laid-up onto forming tool 100, is being formed. To arrive at this configuration, forming tool 180 (including layer 210) may be flipped and placed atop bladder 150 (e.g., after bladder 150 has been placed atop layer 220 on forming tool 100).

Bladder 150 is sandwiched between layer 210 and layer 220. These layers are each held in position by a corresponding forming tool. Cells 152 within bladder 150 will be inflated progressively from the center of bladder 150 to a periphery of bladder 150. That is, FIG. 2 illustrates the ordered inflation of cells 152 in region 120, followed by cells 152 in region 122. This causes air pockets (not shown) between bladder 150 and a layer to proceed in directions 290 towards the periphery of laminate 200 and hence out of the layer. This reduces the number of air pockets remaining in layer 210 and layer 220 during forming, beneficially enhancing strength of the resulting composite part.

Figure 3:
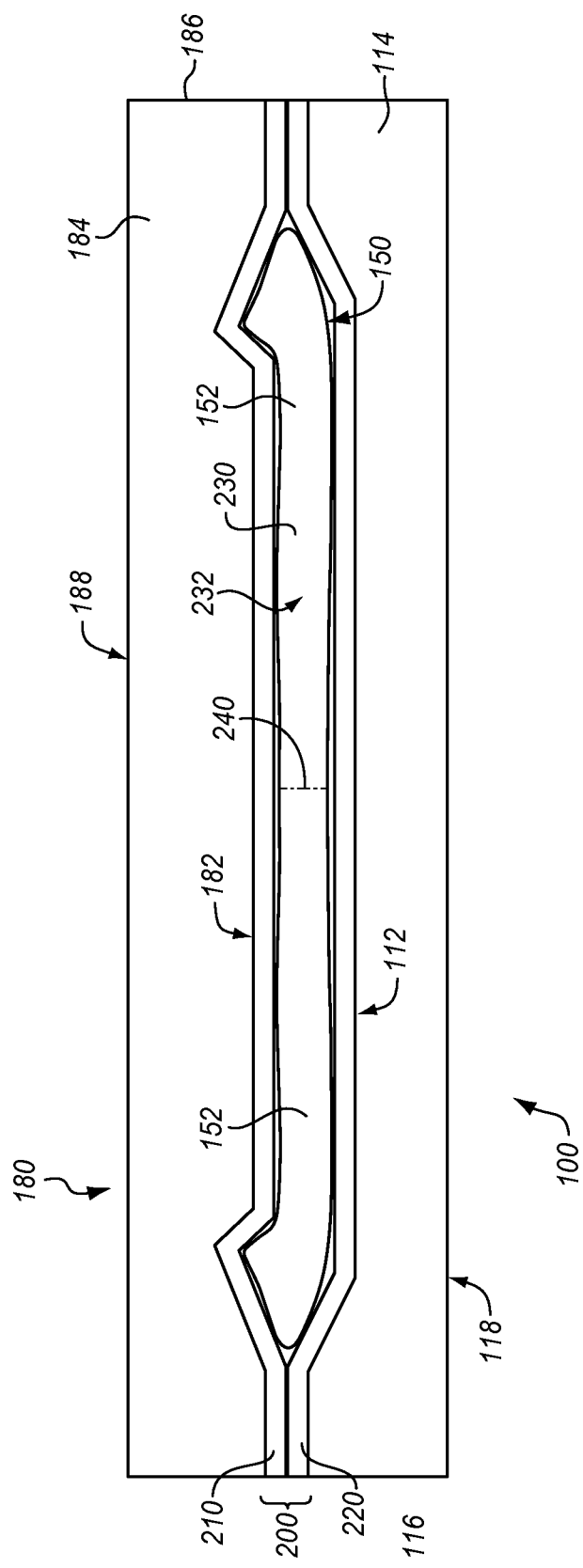
FIG. 3 is a cut through diagram illustrating the bladder and forming tools of FIG. 1 being operated to shape a laminate in an exemplary embodiment.

FIG. 3 is a cut through diagram illustrating the bladder and forming tools of FIG. 1 being operated to shape a laminate in an exemplary embodiment. Specifically, FIG. 2 corresponds with view arrows 3 of FIG. 2. FIG. 3 illustrates that internal volume 230 of bladder 150 is subdivided into cells 152 by walls 240. Walls 240 are flexible in one embodiment, and may comprise the same materials and/or thickness of materials as casing 154. Furthermore, walls 240 are airtight such that gas 232 is incapable of freely traveling between cells 152. This ensures that cells 152 are independently inflatable. As pressure is applied to cells 152, bladder 150 inflates and pressurizes, which forces laminate 200 into conformance with forming tool 100 and forming tool 180. Specifically, layers 210 are consolidated against surface 182, and layers 220 are consolidated against surface 112.

To sum up, bladder 150 enables independent control and inflation of cells 152, because each cell 152 is attached to a unique and distinct piece of ducting 156 controlled by valves 164, which are themselves controlled by controller 168. Controller 168 may therefore inflate individual cells 152 by activating individual valves 164. This eliminates any need for direct electronic communication between controller 168 and cells 152, since each valve 164 may be controlled to apply gas to a different cell 152 via a distinct piece of ducting 156. After the laminate has been cured, cells 152 of bladder 150 may be deflated, and then bladder 150 may be pulled out of the laminate.

Illustrative details of the operation of bladder 150 will be discussed with regard to FIG. 4. Assume, for this embodiment, that a user wishes to generate a composite part made of CFRP, and that the user has layers of constituent material (e.g., dry fiber or "pre-preg" fiber) available for forming the composite part.

Figure 4:
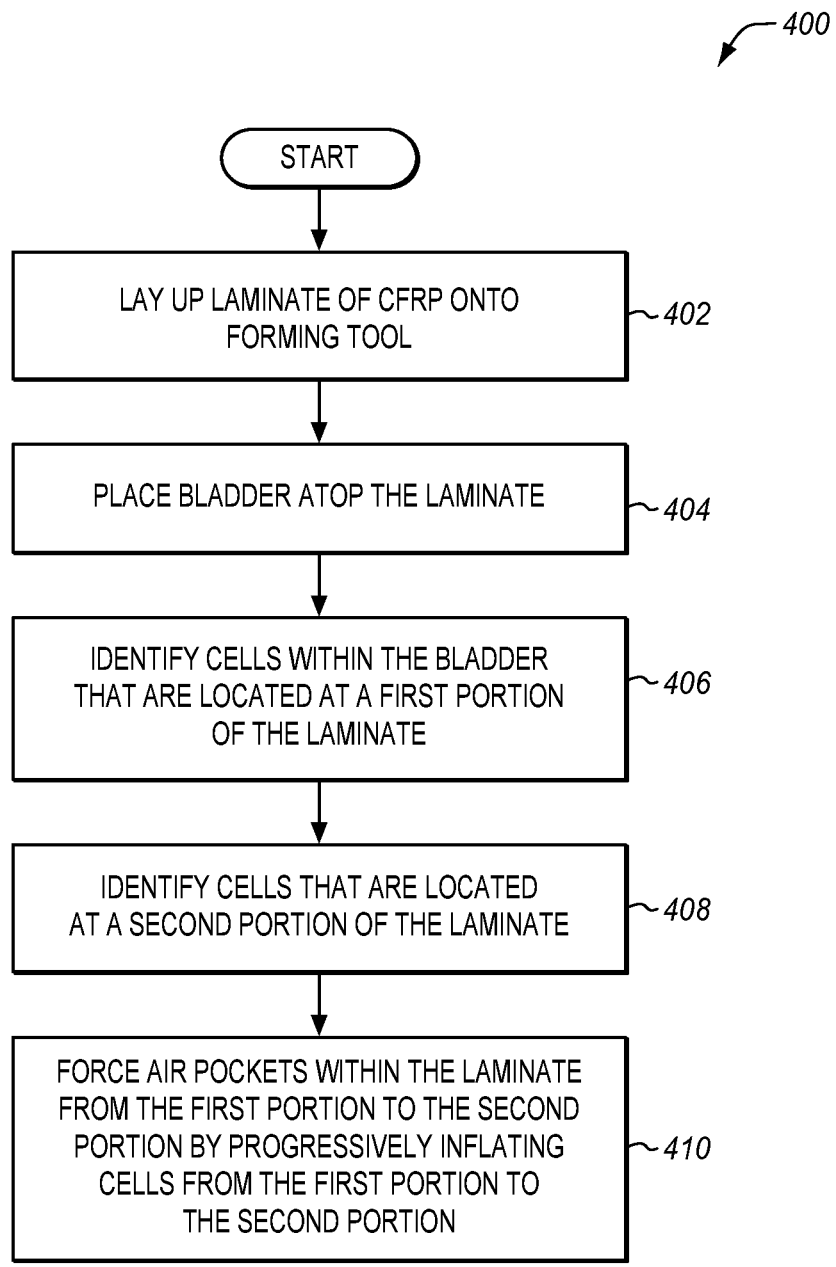
FIG. 4 is a flowchart illustrating a method for fabricating a composite part via a bladder that includes multiple cells in an exemplary embodiment.

FIG. 4 is a flowchart illustrating a method 400 for fabricating a composite part via bladder 150 in an exemplary embodiment. The steps of method 400 are described with reference to bladder 150 of FIG. 1, but those skilled in the art will appreciate that method 400 may be performed with other bladders that include different arrangements of cells. The steps of the flowcharts described herein are not all inclusive and may include other steps not shown. The steps described herein may also be performed in an alternative order.

Layer 220 is laid-up onto surface 112 of forming tool 100 and layer 210 is laid-up onto surface 182 of forming tool 180 (step 402). This process may be performed via any suitable CFRP layup techniques. With laminate 200 laid-up, bladder 150 is placed atop layers 220 of laminate 200 at forming tool 100 (step 404). Forming tool 180 is then placed atop bladder 150, causing bladder 150 to be sandwiched between forming tool 100 and forming tool 180.

Controller 168 identifies cells within bladder 150 that are located within bladder 150 at a first portion (e.g., a central region 120) of the laminate (step 406). This information may be pre-programmed into controller 168, or may be indicated to controller 168 via a set of pressurization sequence instructions indicating the order in which individual cells 152 should be pressurized. Controller 168 further identifies cells 152 within bladder 150 that are located in a second portion (e.g., a periphery comprising regions 122) of the laminate (step 408). These cells 152 may be identified in a similar manner as described for step 406.

With cells 152 in a first portion (e.g., a central portion) and cells 152 in a second portion (e.g., a periphery) identified, controller 168 operates valves 164 to begin forcing air pockets within laminate 200 from the central portion to the periphery by progressively inflating cells from the first portion to the second portion (step 410). This process includes inflating cells 152 in the first portion, followed by inflating cells 152 in the second portion. Thus, cells 152 in the second portion are inflated in response to inflating cells 152 in the first portion. In one embodiment, cells 152 are inflated to between sixty five and ninety PSI. Pressurization/inflation may be caused by controller 168 operating actuators (not shown) to open and/or close valves 164. Controller 168 may perform these operations in a desired sequence such that gas flows from source 165 to cells 152 in a desired order. Step 414 may occur after cells in the central portion have been inflated to a desired level of pressure (e.g., fully pressurized, or some fraction of full pressurization). Steps 406-414 may be performed during curing of laminate 200 by the application of heat (e.g., 190°-290° F.), as part of a debulking process for an uncured laminate, etc. In embodiments wherein bladder 150 is utilized during curing of laminate 200 into a composite part, after curing has completed, bladder 150 may be depressurized and then removed from the composite part resulting from laminate 200.

In short, method 400 enables a controller 168 to selectively pressurize individual cells of bladder 150 by controlling application of gas from source 166 via ducting 156. Utilizing method 400 to inflate cells 152 in an ordered sequence, air pockets within laminate 200 may be pushed out of the laminate instead of being trapped in place by bladder 150. This provides a substantial benefit by enhancing the strength of a resulting composite part.

Figure 5:
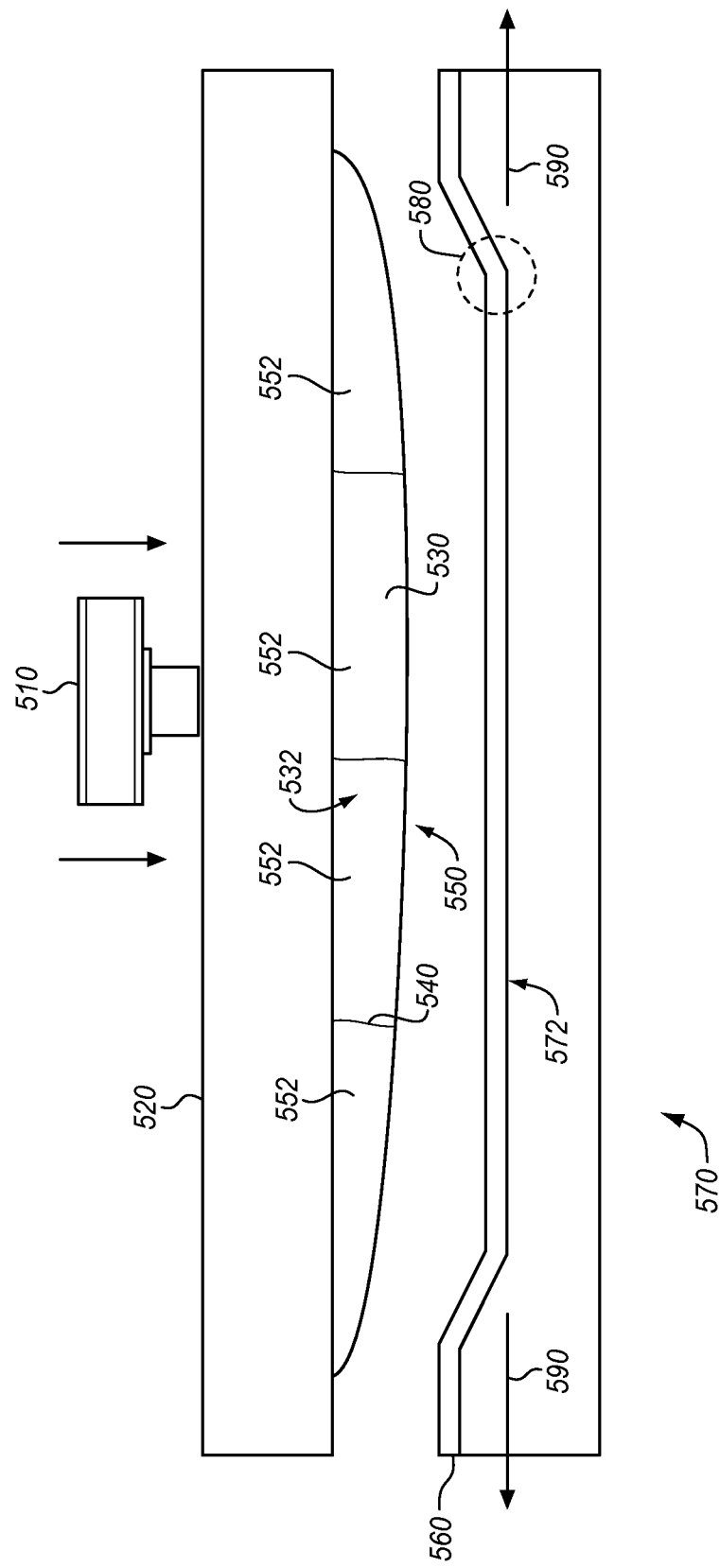
FIG. 5 is a cut through diagram illustrating a bladder fixed to a forming tool in an exemplary embodiment.

FIGS. 5-9 illustrate further exemplary embodiments and uses of pressurizable multi-cell bladders. FIG. 5 is a cut through diagram illustrating a bladder 550 fixed to a forming tool in an exemplary embodiment. In this embodiment, bladder 550 facilitates shaping of a flat laminate 560 (e.g., instead of a hollow laminate such as laminate 200). Bladder 550 is fixedly attached to forming tool 520, and includes cells 552 which are separated by walls 540. That is, walls 540 subdivide internal volume 530 of bladder 550 into cells 552 filled with gas 532. Actuator 510 drives forming tool 520, including bladder 550, onto forming tool 570.

As shown in FIG. 5, laminate 560 has been laid-up onto surface 572. However, interior corners in regions 580 are likely to trap pockets of air in laminate 560 during shaping. To account for this tendency, cells 552 inflate in sequence to force air pockets out during shaping in the directions indicated by arrows 590. Depending on the arrangement of cells 552 within bladder 550, air pockets in regions 580 may also be forced into or out of the page.

Figure 6:
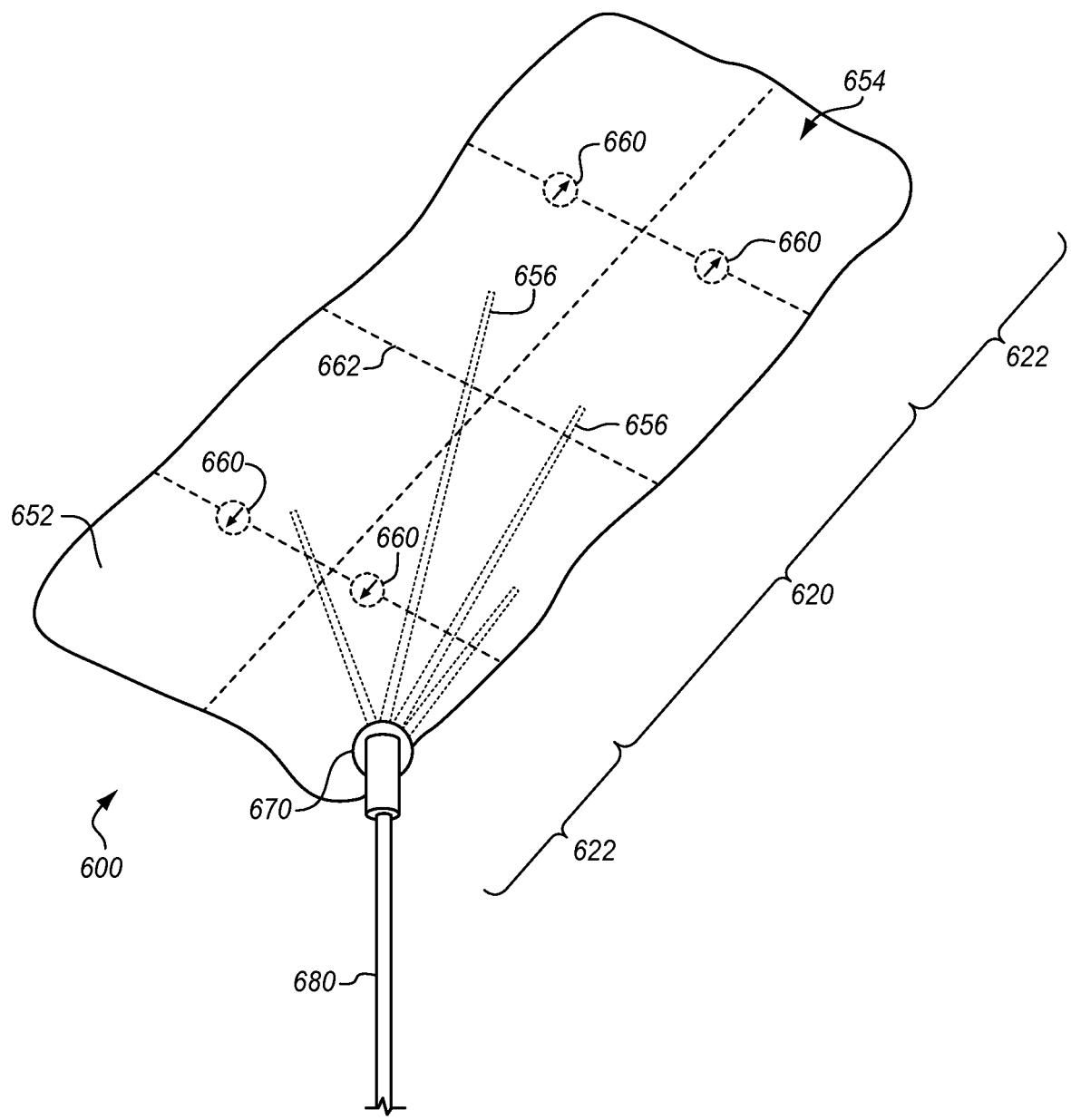
FIG. 6 is a perspective view of a bladder that regulates pressurization of cells via internal valves in an exemplary embodiment.

FIG. 6 is a perspective view of a bladder 600 that regulates pressurization of cells via internal valves in an exemplary embodiment. FIG. 6 shows casing 654, as well as a port 670 that penetrates casing 654 and is fed by line 680. Bladder 600 includes ducting 656 which is internally routed through bladder 600 to cells 652 in a central portion (e.g., region 620) of bladder 600. However, ducting 656 does not directly proceed to cells in the periphery of bladder 600 (e.g., regions 622). Instead, valves 660 (e.g., passive one-way valves, pressure regulators, etc.) are included within bladder 600. Valves 660 enable pressurization to proceed from cells 652 in the central portion to cells 652 along the periphery of bladder 600 (e.g., regions 622). In one embodiment, valves 660 enable gas to enter a cell 652 in the periphery only after a coupled cell has been pressurized above a target level of pressure (e.g., 50 PSI). In this manner, a controller is not necessary to manage the inflation process, as cells 652 will inflate in sequence from the central portion to the periphery.

Figure 7:
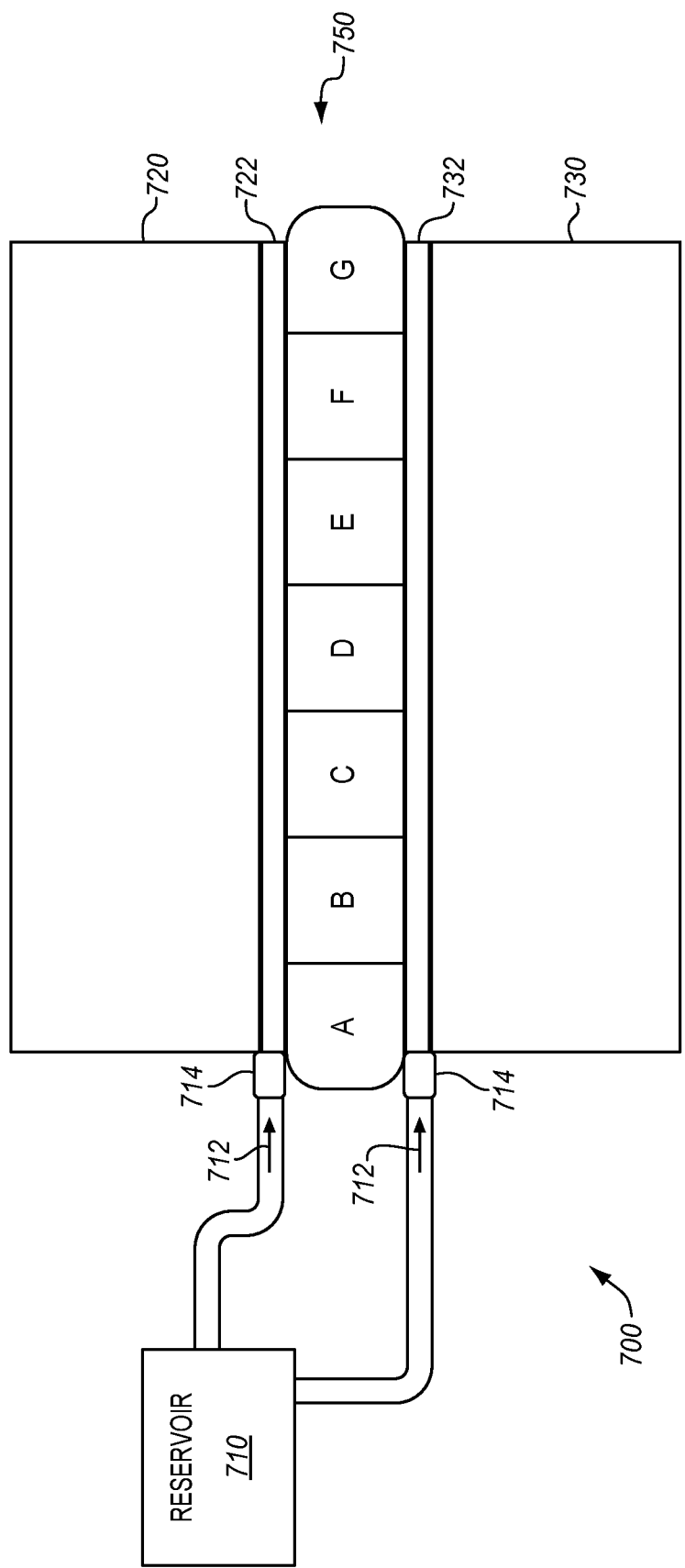
FIG. 7 is a cut through diagram illustrating an air bladder that facilitates resin impregnation processes for a laminate in an exemplary embodiment.

FIG. 7 is a cut through diagram illustrating a bladder 750 that facilitates resin impregnation processes for a laminate (comprising layers 722 and layers 732) in an exemplary embodiment. According to FIG. 7, reservoir 710 supplies curable resin via pressure to layers 722 and layers 732 via ports 714, as indicated by arrows 712. However, because the laminate is thin, it may be particularly hard for resin to impregnate all portions of the laminate, especially portions of the laminate that are proximate to cells E, F, and G. This may be a particular issue when the laminate is squeezed between forming tool 720, forming tool 730, and bladder 750.

To address these issues, bladder 750 controllably pressurizes cells A-G in sequences which are illustrated in tables at FIGS. 8-9. FIG. 8 is a table 800 illustrating pressurization sequences for cells that simulate peristaltic flow in an exemplary embodiment. At some initial point in time, cell A is pressurized ("ON"), then cell B is pressurized while cell A is pressurized, and then cell C is pressurized while cells A and B are pressurized. This corresponds to a first "pulse" of peristaltic flow from cell A towards cell G. At this point in time, cell A is turned off, and cell D is pressurized together with cells B and C. The process continues in like fashion as pulses of peristaltic flow continue to force resin towards cell G.

FIG. 9 is a table 900 illustrating pressurization sequences for cells that massage resin into dry fibers of a laminate in an exemplary embodiment. The processes illustrated in FIG. 9 of oscillating or fluctuating pressurization to various cells helps to massage resin into surrounding fiber. As shown in FIG. 9, cells are iteratively turned on and off to enhance penetration of resin between individual fibers of a laminate.

EXAMPLES

In the following examples, additional processes, systems, and methods are described in the context of a bladder that facilitates shaping of a laminate.

Figure 10:
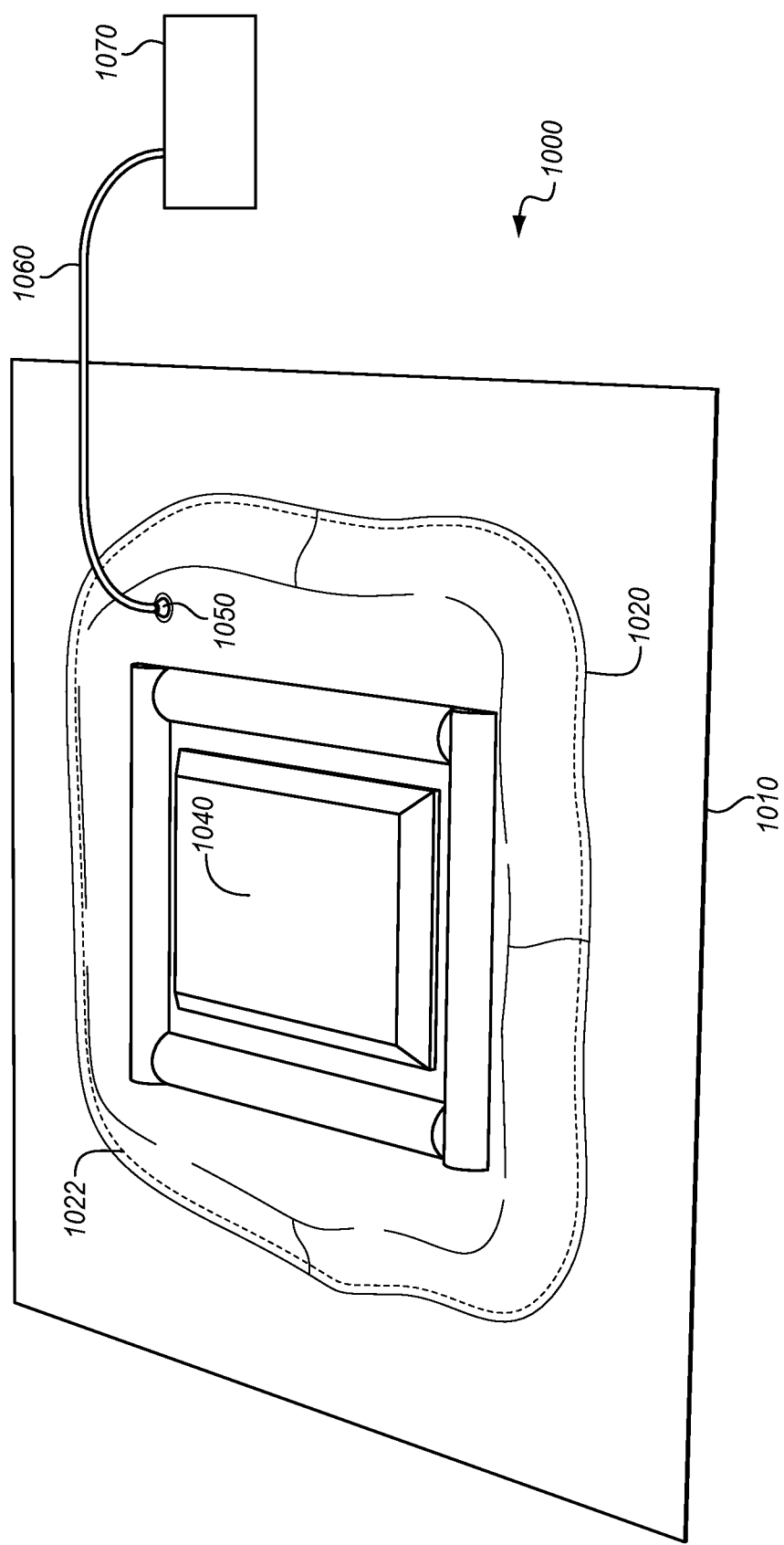
FIG. 10 is a diagram illustrating an air bladder for use in vacuum bagging in an exemplary embodiment.

FIG. 10 is a diagram illustrating an air bladder for use in vacuum bagging in an exemplary embodiment. System 1000 utilizes vacuum bag techniques to consolidate, form, and/or cure a laminate 1040 into a composite part. In this embodiment, system 1000 includes forming tool 1010, which forms a surface about which laminate 1040 conforms to during manufacturing. Laminate 1040 may comprise a "prepreg" carbon fiber laminate that has been pre-impregnated with a curable resin, or any suitable curable laminate awaiting resin impregnation. As shown in FIG. 10, laminate 1040 is held in place on tool 1010 via vacuum bag 1020, which is taped/sealed via edge sealant 1022 to surround laminate 1040 on tool 1010. Vacuum bag 1020 is a progressively inflatable bladder having multiple internal cells which are individually inflatable. For example, vacuum bag 1020 may comprise bladder 150 of FIG. 1.

Breathers may surround and or cover laminate 1040 and are sealed under vacuum bag 1020. The breathers provide passageways for resin, air and volatile gases from the curing process to travel out of the preform within vacuum bag 1020. Excess resin and volatile gases then exit vacuum bag 1020 via port 1050, which operates as a fitting for vacuum line 1060. Vacuum line 1060 is powered in this embodiment by compressor 1070.

While in operation, compressor 1070 may evacuate air from underneath vacuum bag 1020. Removing the air under vacuum bag 1020 allows atmospheric pressure to press the vacuum bag against the laminate 1040. This holds vacuum bag 1020 against laminate 1040 to conform laminate 1040 to tool 1010. Compressor 1070 may also or alternatively inflate, via a manifold, individual cells of vacuum bag 1020 to apply varying pressure to the preform. The pressure also causes vacuum bag 1020 to tightly conform to the breathers. This provides a benefit in holding laminate 1040 tightly against the contours of tool 1010 as laminate 1040 cures, and also provides a benefit in that it enables selective application of variable pressure across the vacuum bag help to draw out gas bubbles and/or excess resin that would otherwise be present during the curing process. The curing process itself may further be performed during the application of substantial amounts of pressure and/or heat (e.g., within an autoclave).

Figure 11:
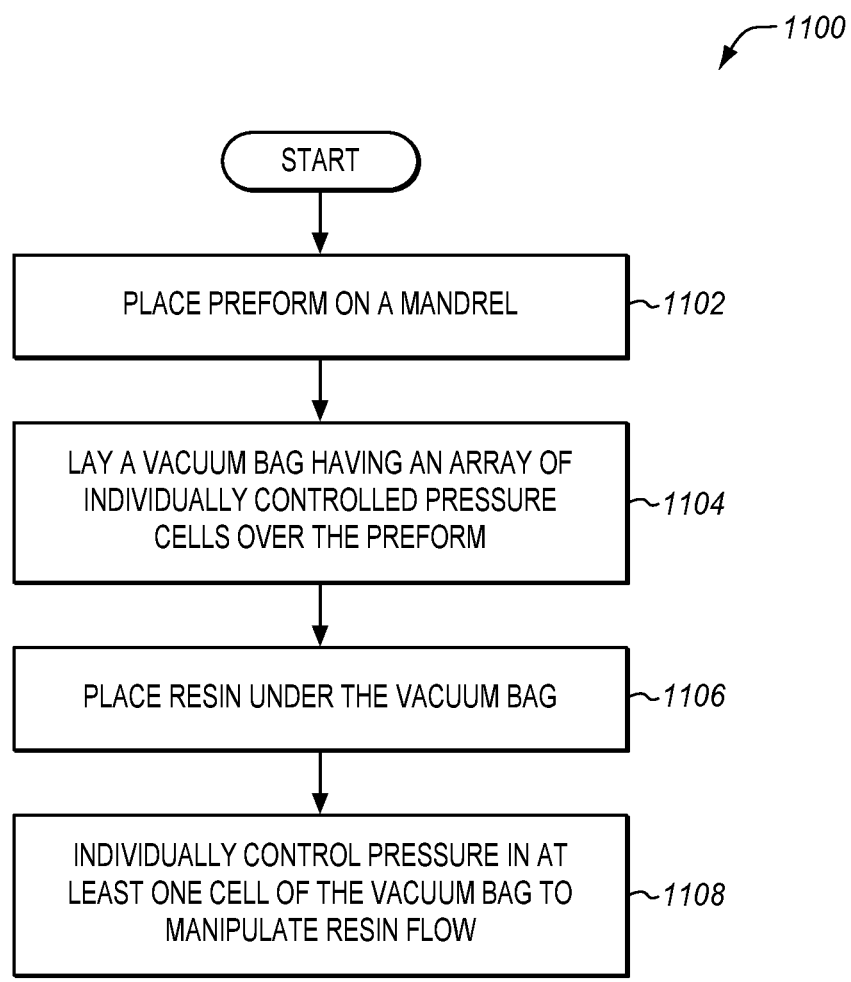
FIG. 11 is a flowchart illustrating a method of operating an air bladder as a vacuum bag for facilitating resin impregnation in an exemplary embodiment.

FIG. 11 is a flowchart illustrating a method 1100 of operating an air bladder as a vacuum bag for facilitating resin impregnation in an exemplary embodiment. According to FIG. 11, the method includes controlling resin movement within a composite pre-form (e.g., laminate 1040) by placing the preform on a mandrel (e.g., forming tool 1010) (step 1102). The method further includes laying a vacuum bag 1020 (also known as a caul sheet) with an array of individually controlled pressure cells 152 over the pre-form (step 1104), placing resin under the vacuum bag-caul sheet (step 1106), and individually controlling the pressure in at least one cell of the vacuum bag 1020 to manipulate resin flow (1108). In further embodiments, the method may include infusing resin into the preform.

Figure 12:
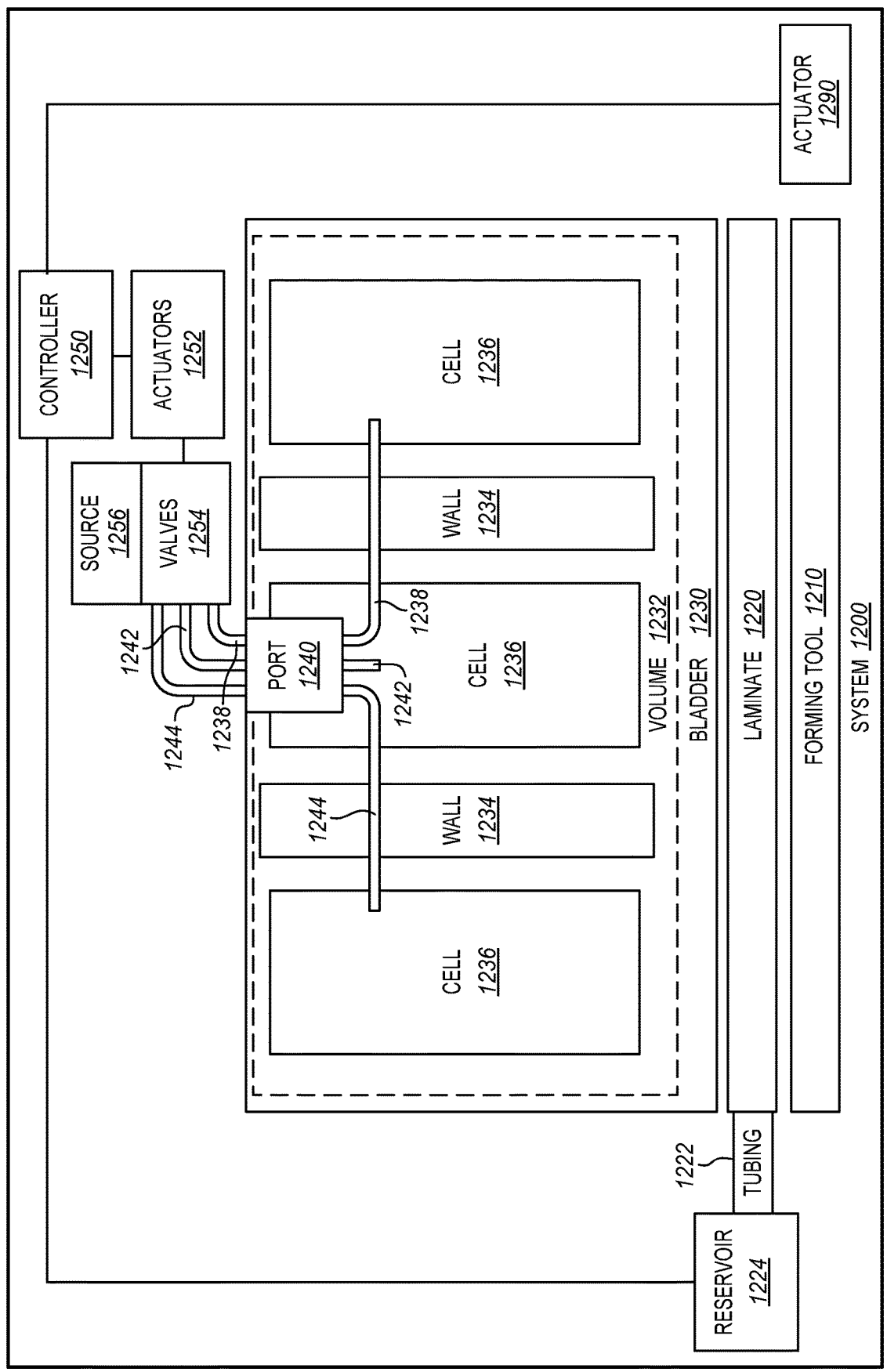
FIG. 12 is a block diagram of a laminate forming system in an exemplary embodiment.

FIG. 12 is a block diagram of a laminate forming system 1200 in an exemplary embodiment. In this embodiment, a laminate 1220 is laid-up onto a forming tool 1210. The laminate is impregnated with resin from reservoir 1224 via tubing 1222. Meanwhile, actuator 1290 is managed by controller 1250 to adjust the position of forming tool 1210.

Controller 1250 further controls actuators 1252, which controllably open and close valves 1254. When valves 1254 are open, gas (e.g., air) flows from source 1256 via ducting (1238, 1242, 1244) into port 1240. Gas then proceeds via ducting 1238, 1242, 1244) into different cells 1236 which are separated by walls 1234. Walls 1234 subdivide internal volume 1232 of bladder 1230 into cells 1236.

Figure 13:
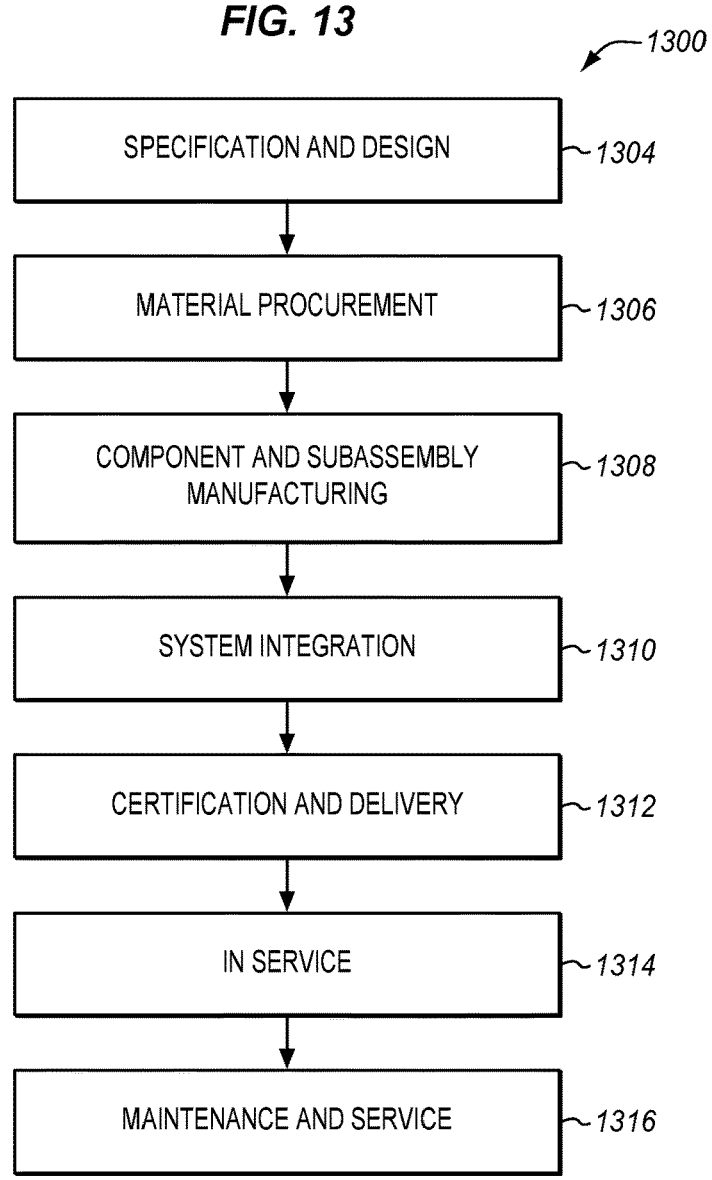
FIG. 13 is a flow diagram of aircraft production and service methodology in an exemplary embodiment.
Figure 14:
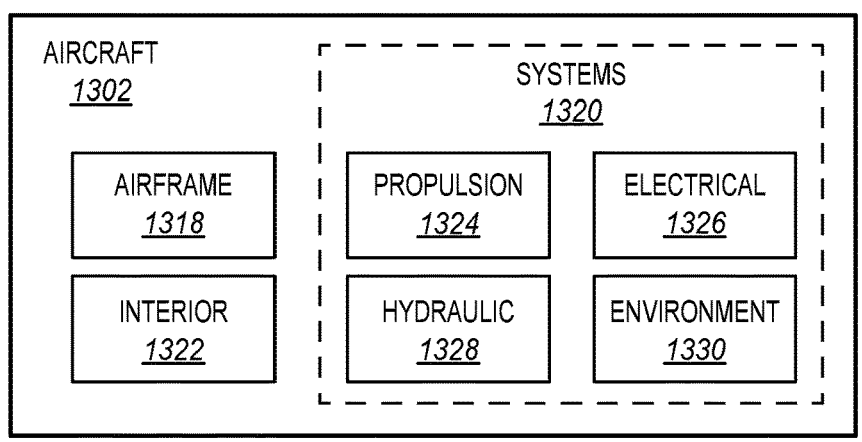
FIG. 14 is a block diagram of an aircraft in an exemplary embodiment.

Referring more particularly to the drawings, embodiments of the disclosure may be described in the context of an aircraft manufacturing and service method 1300 as shown in FIG. 13 and an aircraft 1302 as shown in FIG. 14. During pre-production, exemplary method 1300 may include specification and design 1304 of the aircraft 1302 and material procurement 1306. During production, component and subassembly manufacturing 1308 and system integration 1310 of the aircraft 1302 takes place. Thereafter, the aircraft 1302 may go through certification and delivery 1312 in order to be placed in service 1314. While in service by a customer, the aircraft 1302 is scheduled for routine maintenance and service 1316 (which may also include modification, reconfiguration, refurbishment, and so on). Apparatus and methods embodied herein may be employed during any one or more suitable stages of the production and service method 1300 (e.g., specification and design 1304, material procurement 1306, component and subassembly manufacturing 1308, system integration 1310, certification and delivery 1312, service 1314, maintenance and service 1316) and/or any suitable component of aircraft 1302 (e.g., airframe 1318, systems 1320, interior 1322, propulsion 1324, electrical 1326, hydraulic 1328, environmental 1330).

Each of the processes of method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 1302 produced by exemplary method 1300 may include an airframe 1318 with a plurality of systems 1320 and an interior 1322. Examples of high-level systems 1320 include one or more of a propulsion system 1324, an electrical system 1326, a hydraulic system 1328, and an environmental system 1330. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1300. For example, components or subassemblies corresponding to production stage 1308 may be fabricated or manufactured in a manner similar to components or subassemblies produced while the aircraft 1302 is in service. Also, one or more apparatus embodiments, method embodiments, or a combination thereof may be utilized during the production stages 1308 and 1310, for example, by substantially expediting assembly of or reducing the cost of an aircraft 1302. Similarly, one or more of apparatus embodiments, method embodiments, or a combination thereof may be utilized while the aircraft 1302 is in service, for example and without limitation, to maintenance and service 1316. For example, the techniques and systems described herein may be used for steps 1306, 1308, 1310, 1314, and/or 1316, and/or may be used for airframe 1318 and/or interior 1322. These techniques and systems may even be utilized for systems 1320, including for example propulsion 1324, electrical 1326, hydraulic 1328, and/or environmental 1330.

In one embodiment, bladder 150 is utilized to form a composite part that comprises a portion of airframe 1318, and is manufactured during component and subassembly manufacturing 1308. The composite part may then be assembled into an aircraft in system integration 1310, and then be utilized in service 1314 until wear renders the composite part unusable. Then, in maintenance and service 1316, the composite part may be discarded and replaced with a newly manufactured part. Air bladder 150 may be utilized throughout component and subassembly manufacturing 1308 in order to manufacture additional composite parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A system comprising:
a first forming tool;
a second forming tool;
a bladder comprising:
    a casing that encloses an internal volume; and
    walls within the bladder that subdivide the internal volume into cells that are airtight with respect to each other;
a laminate comprising carbon fiber layers placed in direct contact with a first surface of the bladder between the bladder and the first forming tool, and additional carbon fiber layers placed in direct contact with a second surface of the bladder between the bladder and the second forming tool;
a source of pressurized gas;
ducting that independently couples the source with each of the cells; and
a controller configured to control inflation of the bladder by selectively inflating individual cells of the bladder, while the bladder is sandwiched between layers of the laminate that are each held in position by the first and second forming tools.

2. The system of claim 1 wherein:
the controller is configured to identify cells in the bladder that are located at a first portion of the laminate;
the controller is configured to identify cells in the bladder that are located at a second portion of the laminate; and
the controller is configured to inflate cells in the first portion prior to inflating cells in the second portion, thereby causing the bladder to force air pockets in the laminate from the first portion to the second portion.

3. The system of claim 1 wherein:
the bladder further comprises a main port that penetrates the casing, and
the ducting is routed through the internal volume of the bladder, and exits the bladder via the main port.

4. The system of claim 1 further comprising:
a reservoir of resin;
wherein during impregnation of the laminate with resin from the reservoir, the controller is configured to oscillate pressure at each of the cells causing the cells to repeatedly massage resin into fibers of the laminate.

5. The system of claim 1 further comprising:
a reservoir of resin; and
a port applying resin from the reservoir to the laminate;
wherein the bladder includes cells proximate to the port and cells distal from the port; and wherein the controller is configured to iteratively pressurize cells proximate to the port, pressurize cells distal from the port, depressurize cells proximate to the port, and depressurize cells distal from the port.

6. The system of claim 1 further comprising:
valves that are attached to the ducting for each cell; and
actuators that open and close the valves in accordance with input from the controller.

7. The system of claim 1 wherein:
the controller is configured to direct an actuator that drives the second forming tool toward the first forming tool.

8. A method comprising:
laying up layers of a laminate comprising carbon fibers onto a first forming tool;
placing a bladder atop the layers of the laminate with a first surface of the bladder in direct contact with the laminate;
placing additional layers of the laminate atop the bladder in direct contact with a second surface of the bladder;
placing a second forming tool atop the laminate;
identifying cells within the bladder that are in direct contact with a first portion of the laminate;
identifying cells within the bladder that are in direct contact with a second portion of the laminate;
selectively inflating cells of a subdivided internal volume of the bladder that includes cells which are separated by walls and are airtight with respect to each other; and
forcing air pockets of the laminate from the first portion to the second portion during selective inflation, by progressively inflating cells from the first portion to the second portion to different levels of pressure, wherein the bladder is sandwiched between the layers of the laminate and the additional layers of the laminate, which are held in position by the first and second forming tools.

9. The method of claim 8 further comprising:
inflating the cells that directly contact the first portion of the laminate prior to inflating the cells that directly contact the second portion of the laminate.

10. The method of claim 9 further comprising:
inflating the cells that directly contact the first portion of the laminate to at least 65 pounds per square inch of pressure prior to inflating the cells that directly contact the second portion of the laminate.

11. The method of claim 8 wherein:
the bladder comprises a silicone casing.

12. The method of claim 8 further comprising:
waiting for the laminate to cure into a composite part;
depressurizing the bladder; and
removing the bladder from the composite part after depressurization.

13. The method of claim 8 further comprising:
impregnating the laminate with a curable resin via a port;
during impregnation of the laminate with curable resin, oscillating pressure applied to each of the cells, causing the cells to repeatedly massage resin into the carbon fibers of the laminate.

14. The method of claim 8 further comprising:
impregnating the laminate with a curable resin via a port; and
during impregnation, iteratively:
pressurizing cells proximate to the port;
pressurizing cells distal from the port;
depressurizing cells proximate to the port; and
depressurizing cells distal from the port.

15. The method of claim 8 wherein: the cells are inflated with air.

16. The method of claim 8 further comprising:
operating actuators that control valves leading to the cells.

17. The method of claim 8 further comprising:
operating valves that enable gas to enter a cell only after a coupled cell has been pressurized above a target level of pressure.

18. The method of claim 8 wherein:
the first portion comprises a central portion, and the second portion comprises a periphery.

19. The method of claim 8 further comprising:
operating a compressor to generate pressurized gas for the cells.

20. The method of claim 8 wherein:
the cells are inflated to between sixty-five and ninety pounds per square inch.

* * * * *